US012667236B2

(12) United States Patent (10) Patent No.: US 12,667,236 B2
Sohn et al. (45) Date of Patent: Jun. 30, 2026

(54) ROBOT

(71) Applicant: LG ELECTRONICS INC., Seoul (KR)

(72) Inventors: Byungkon Sohn, Seoul (KR); Kyuchun Choi, Seoul (KR); Youngkouk Song, Seoul (KR); Changhyeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 922 days.

(21) Appl. No.: 17/442,721

(22) PCT Filed: Mar. 4, 2020

(86) PCT No.: PCT/KR2020/003038
§ 371 (c)(1),
(2) Date: Sep. 24, 2021

(87) PCT Pub. No.: WO2020/197119
PCT Pub. Date: Oct. 1, 2020

(65) Prior Publication Data
US 2022/0183525 A1 Jun. 16, 2022

(30) Foreign Application Priority Data

Mar. 26, 2019 (KR) ........................ 10-2019-0034540

(51) Int. Cl.
*A47L 9/28* (2006.01)
*A47L 9/00* (2006.01)
*G05D 1/00* (2006.01)
(52) U.S. Cl.
CPC ............. *A47L 9/2805* (2013.01); *A47L 9/009* (2013.01); *A47L 9/2852* (2013.01);
(Continued)

(58) Field of Classification Search
CPC ...... A47L 9/2852; A47L 9/2805; A47L 9/009; A47L 2201/04; G05D 1/0248; G05D 1/0255
See application file for complete search history.

(56) References Cited

U.S. PATENT DOCUMENTS

2013/0076893 A1* 3/2013 Jeong ................... G05D 1/0248
348/135
2013/0226344 A1* 8/2013 Wong ................... G05D 1/0242
901/1
(Continued)

FOREIGN PATENT DOCUMENTS

CN 105411490 3/2016
CN 105425793 3/2016
(Continued)

OTHER PUBLICATIONS

Japanese Office Action dated Sep. 27, 2022 issued in Application No. 2021-556277.
(Continued)

*Primary Examiner* — Abdallah Abulaban
(74) *Attorney, Agent, or Firm* — KED & ASSOCIATES, LLP

(57) ABSTRACT

A robot cleaner comprises a cleaner body provided with a control unit; a first sensing unit which protrudes from the upper surface of the cleaner body, and emits laser at surroundings of the cleaner body to detect obstacles located around the cleaner body; a second sensing unit which is inclined relative to side surfaces and an upper surface of an upper edge portion of the cleaner body, and captures images in both lateral and upward directions of the cleaner body; a third sensing unit which is disposed on a front surface of the cleaner body, transmits ultrasonic waves to the surroundings in front of the cleaner body, and then uses the reflected ultrasonic waves to detect obstacles located in front of the
(Continued)

cleaner body; and a fourth sensing unit which is disposed on the front surface of the cleaner body, and captures images in front of the cleaner body.

8 Claims, 10 Drawing Sheets

(52) U.S. Cl.
CPC ......... *G05D 1/0248* (2013.01); *G05D 1/0255* (2013.01); *A47L 2201/04* (2013.01)

(56) References Cited

U.S. PATENT DOCUMENTS

| | | | |
|---|---|---|---|
| 2017/0231447 | A1 | 8/2017 | Izawa et al. |
| 2017/0332865 | A1* | 11/2017 | Nam .......................... A47L 9/02 |
| 2018/0177361 | A1 | 6/2018 | Song et al. |
| 2018/0353042 | A1* | 12/2018 | Gil ...................... A47L 11/4044 |
| 2019/0187717 | A1 | 6/2019 | He et al. |
| 2019/0298139 | A1* | 10/2019 | Takaoka ................ A47L 9/2826 |
| 2019/0320867 | A1 | 10/2019 | Noh et al. |

FOREIGN PATENT DOCUMENTS

| | | |
|---|---|---|
| CN | 107752910 | 3/2018 |
| CN | 207424680 | 5/2018 |
| CN | 108247647 | 7/2018 |
| JP | H04-147084 | 5/1992 |
| JP | 2006-209644 | 8/2006 |
| JP | 2014-085940 | 5/2014 |
| JP | 2018-041205 | 3/2018 |
| KR | 10-2017-0033374 | 3/2017 |
| KR | 10-2017-0131172 | 11/2017 |
| KR | 10-2018-0058511 | 6/2018 |
| KR | 10-2018-0098040 | 9/2018 |
| KR | 10-2018-0138210 | 12/2018 |
| KR | 10-1949279 | 2/2019 |
| WO | WO 2018/225172 | 12/2018 |

OTHER PUBLICATIONS

Chinese Office Action dated Mar. 11, 2022 issued in CN Application No. 202080023084.4.
International Search Report dated Jun. 18, 2020 issued in Application No. PCT/KR2020/003038.
Korean Notice of Allowance dated Jun. 17, 2020 issued in Application No. 10-2019-0034540.
Korean Office Action dated Feb. 9, 2020 issued in Application No. 10-2019-0034540.
Extended European Search Report dated Mar. 6, 2023 issued in Application No. 20776926.6.

* cited by examiner

ROBOT

CROSS-REFERENCE TO RELATED PATENT APPLICATIONS

This application is a U.S. National Stage Application under 35 U.S.C. § 371 of PCT Application No. PCT/KR2020/003038, filed Mar. 4, 2020, which claims priority to Korean Patent Application No. 10-2019-0034540, filed Mar. 26, 2019, whose entire disclosures are hereby incorporated by reference.

FIELD

The present disclosure relates to a robot cleaner that performs a function of cleaning a floor while traveling on its own in a predetermined area.

BACKGROUND ART

In general, a robot cleaner recognizes a surrounding environment on its own and performs a cleaning function suitable for the environment while autonomously traveling in a predetermined area. A typical cleaning function performed by a robot cleaner may include a function of suctioning and removing dust or foreign substances existing in a floor area. In addition, robot cleaners may be used in various environments such as warehouses, homes, and offices.

Meanwhile, autonomous driving (autonomous travel), which is one of core technologies of a robot cleaner, can be achieved as the robot cleaner accurately recognizes its current location in an environment in which the robot cleaner works.

In general, a robot cleaner may recognize its current location based on map information which is created by performing a Simultaneous Localization And Map-Building (SLAM) task using information obtained through various sensors. A robot cleaner also performs a function of capturing and monitoring the inside of a house by using autonomous driving characteristics.

In addition, in order to enable smooth autonomous driving of a robot cleaner, development of a technology for detecting an obstacle existing in a traveling area (driving area) is required.

Accordingly, as disclosed in Korean Laid-open Publication No. 10-2017-0131172 (Nov. 29, 2017), various attempts are made to apply various sensors for capturing or detecting a front area of a robot cleaner to implement autonomous traveling and obstacle avoidance of the robot cleaner, and the number of sensors applied to the robot cleaner is more increasing than before according to such attempts.

At the same time, in order to further improve an autonomous driving performance and an obstacle avoidance function of robot cleaners, researches on the optimized design of various sensors applied to robot cleaners are being conducted.

DISCLOSURE

Technical Problem

A first aspect of the present disclosure is to provide an optimized configuration and arrangement structure of sensing units applied to a robot cleaner to further improve autonomous driving and obstacle avoidance performances of the robot cleaner.

A second aspect of the present disclosure is to provide an optimized structure of sensing units applied to a robot cleaner for recognizing a current position.

A third aspect of the present disclosure is to provide an optimized structure of sensing units applied to a robot cleaner for avoiding obstacles.

Technical Solution

In order to achieve these and other advantages and in accordance with the purpose of this specification, as embodied and broadly described herein, there is provided a robot cleaner that may include a cleaner body including a control unit for controlling autonomous driving, a first sensing unit protruding from an upper surface of the cleaner body to irradiate a laser to surroundings of the cleaner body so as to detect obstacles located at the surroundings of the cleaner body, a second sensing unit disposed on an upper edge portion of the cleaner body to be inclined with respect to a side surface and an upper surface of the cleaner body, to capture a lateral direction and an upward direction of the cleaner body, a third sensing unit disposed on the front surface of the cleaner body to detect obstacles located at surroundings in front of the cleaner body using ultrasonic waves reflected after being emitted to the surroundings in front of the cleaner body, and a fourth sensing unit disposed on the front surface of the cleaner body to capture the front of the cleaner body.

The second sensing unit may include a first camera part and a second camera part disposed on one side and another side of the upper edge portion of the cleaner body in an inclined manner, to capture the lateral direction and the upward direction of the cleaner body.

The control unit may merge all or parts of information measured by the first sensing unit and image information captured by the first and second camera parts, to detect a current position in a traveling area.

The second sensing unit may be disposed at a position lower than a position of the first sensing unit based on a vertical direction of the cleaner body.

The first sensing unit may be disposed behind the second sensing unit.

The first sensing unit may detect an obstacle located within a preset detection distance by irradiating a linear laser in a range of 360 degrees.

The third sensing unit may be disposed at a position lower than a position of the fourth sensing unit based on a vertical direction of the cleaner body.

The third sensing unit may be provided in plurality, disposed at symmetrical positions in a left and right direction based on a front center line of the cleaner body.

The fourth sensing unit may be disposed such that an optical axis is inclined toward a front lower side of the cleaner body, and may have an image capturing range including from a ground area up to a highest area of the cleaner body.

The fourth sensing unit may capture a depth image including distance information related to an object within a capturing area.

The control unit may merge all or parts of information measured by the first sensing unit, information measured by the third sensing unit, and image information captured by the fourth sensing unit, to detect obstacles located at the surroundings of the cleaner body.

In order to achieve the second aspect of the present disclosure, there is provided a robot cleaner that may include a cleaner body including a control unit for controlling autonomous driving, a first sensing unit protruding from an upper surface of the cleaner body to irradiate a laser to surroundings of the cleaner body so as to detect obstacles located at the surroundings of the cleaner body, and a second sensing unit disposed on an upper edge portion of the cleaner body to be inclined with respect to a side surface and an upper surface of the cleaner body, to capture a lateral direction and an upward direction of the cleaner body.

The second sensing unit may include a first camera part and a second camera part disposed on one side and another side of the upper edge portion of the cleaner body in an inclined manner, to capture the side direction and the upward direction of the cleaner body.

In order to achieve the third aspect of the present disclosure, there is provided a robot cleaner that may include a cleaner body including a control unit for controlling autonomous driving, a first sensing unit protruding from an upper surface of the cleaner body to irradiate a laser to surroundings of the cleaner body so as to detect obstacles located at the surroundings of the cleaner body, a third sensing unit disposed on the front surface of the cleaner body to detect obstacles at surroundings in front of the cleaner body using ultrasonic waves reflected after being emitted to the surroundings in front of the cleaner body, and a fourth sensing unit disposed on the front surface of the cleaner body to capture the front of the cleaner body.

The fourth sensing unit may be disposed such that an optical axis is inclined downward toward the front of the cleaner body, and may have an image capturing range including from a ground area up to a highest area of the cleaner body.

Advantageous Effects

The effects of the present disclosure obtained by the aforementioned solutions are as follows.

First, a first sensing unit irradiating a laser to surroundings of a cleaner body and a second sensing unit capturing lateral and upward directions of the cleaner body may be arranged in order to achieve a position recognition for implementing an autonomous driving function of a robot cleaner, and the first sensing unit, a third sensing unit emitting ultrasonic waves to surroundings in front of the cleaner body, and a fourth sensing unit capturing images of the front of the cleaner body may be arranged to realize obstacle avoidance of the robot cleaner. Accordingly, detection functions of the first to fourth sensing units can be complemented by such configuration and arrangement of the first to fourth sensing units that detect different areas while using different methods such as light or ultrasonic waves, thereby more improving autonomous driving and obstacle avoidance performances of the robot cleaner.

Second, a first sensing unit irradiating a laser to surroundings of a cleaner body and a second sensing unit capturing lateral and upward directions of the cleaner body may be arranged in order to achieve position recognition for implementing an autonomous driving function of a robot cleaner, information acquired through the first sensing unit can be used for an area which is not detected by the second sensing unit, thereby more improving an autonomous driving function of the robot cleaner.

Third, a first sensing unit irradiating a laser to surroundings of a cleaner body, a third sensing unit emitting ultrasonic waves to surroundings in front of the cleaner body, and a fourth sensing unit capturing images of the front of the cleaner body may be arranged in order to implement an obstacle avoidance function of a robot cleaner. Accordingly, objects that are impossible or difficult to be detected by the first sensing unit, the third sensing unit, and the fourth sensing unit can be detected through a complementing process, thereby more improving obstacle avoidance performance of the robot cleaner.

BEST MODE FOR CARRYING OUT
PREFERRED IMPLEMENTATIONS

Hereinafter, a robot cleaner according to the present disclosure will be described in detail with reference to the accompanying drawings.

Figure 1:
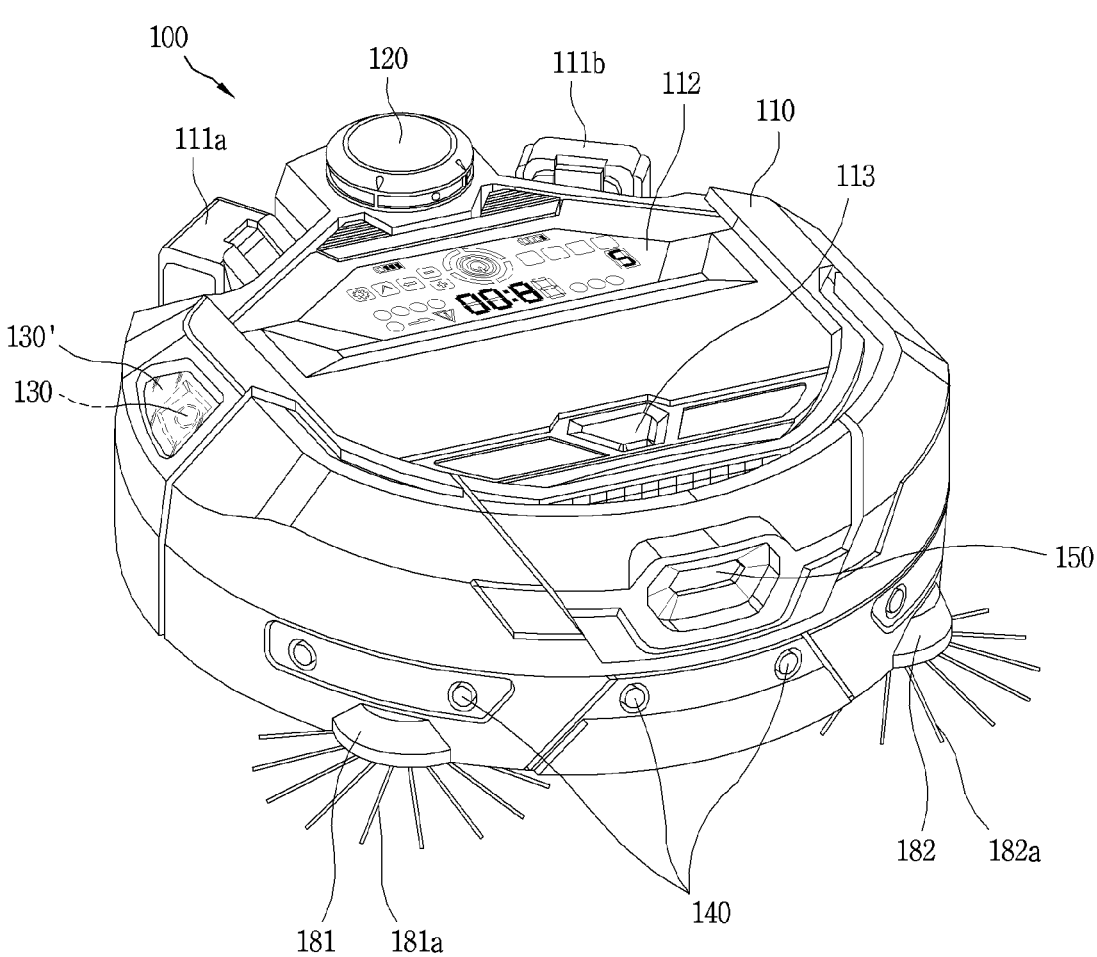
FIG. 1 is a perspective view illustrating one example of a robot cleaner in accordance with the present disclosure.
Figure 2:
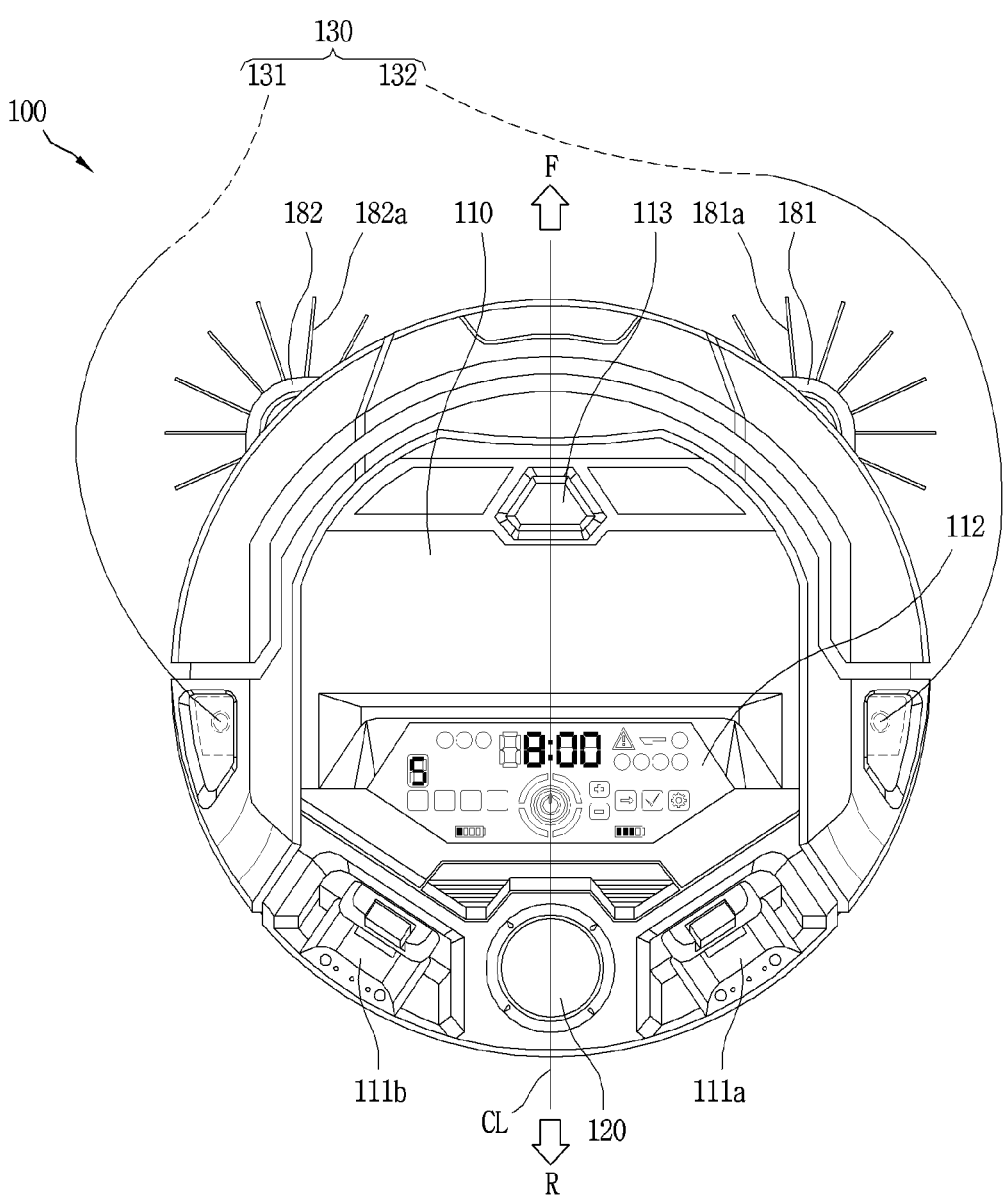
FIG. 2 is a planar view of the robot cleaner illustrated in FIG. 1.
Figure 3:
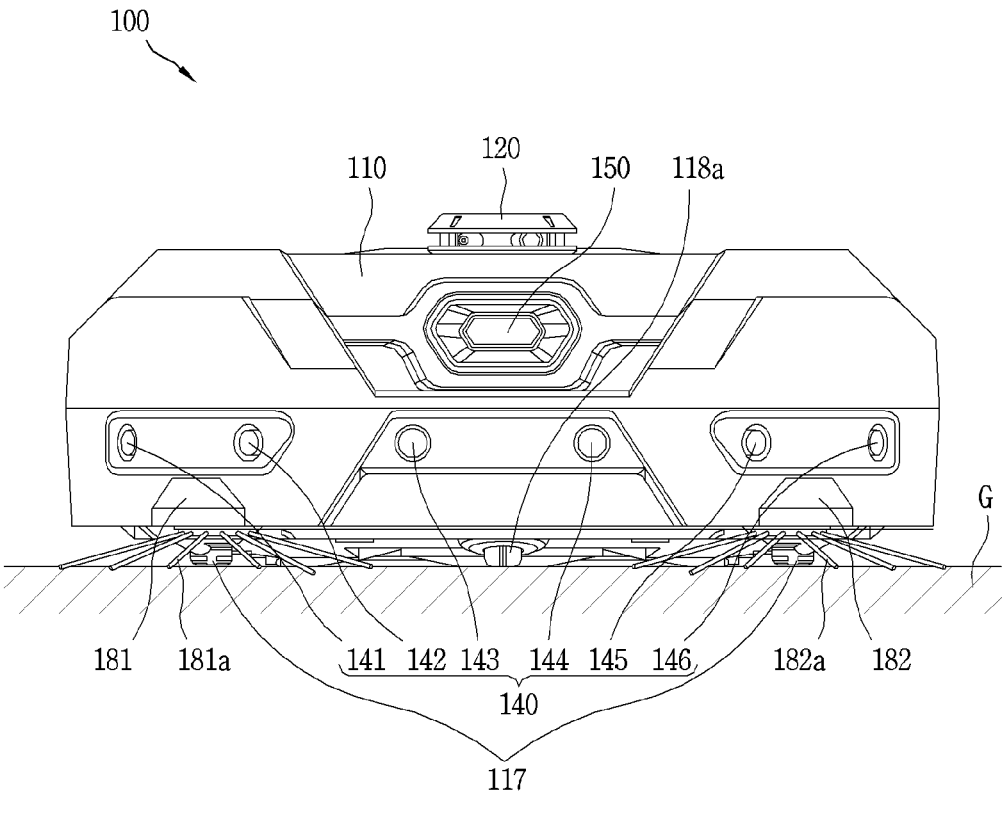
FIG. 3 is a front view of the robot cleaner illustrated in FIG. 1.
Figure 4:
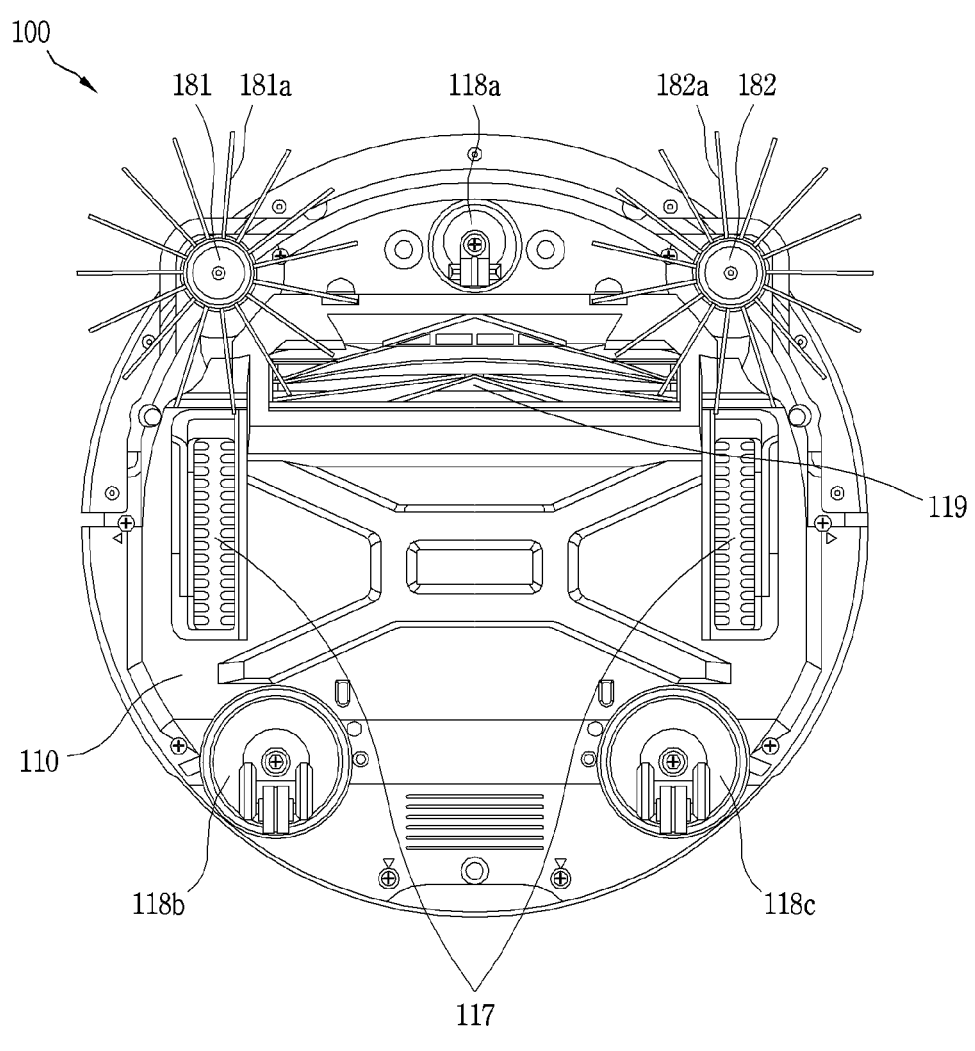
FIG. 4 is a view illustrating a lower portion of the robot cleaner illustrated in FIG. 1.
Figure 5:
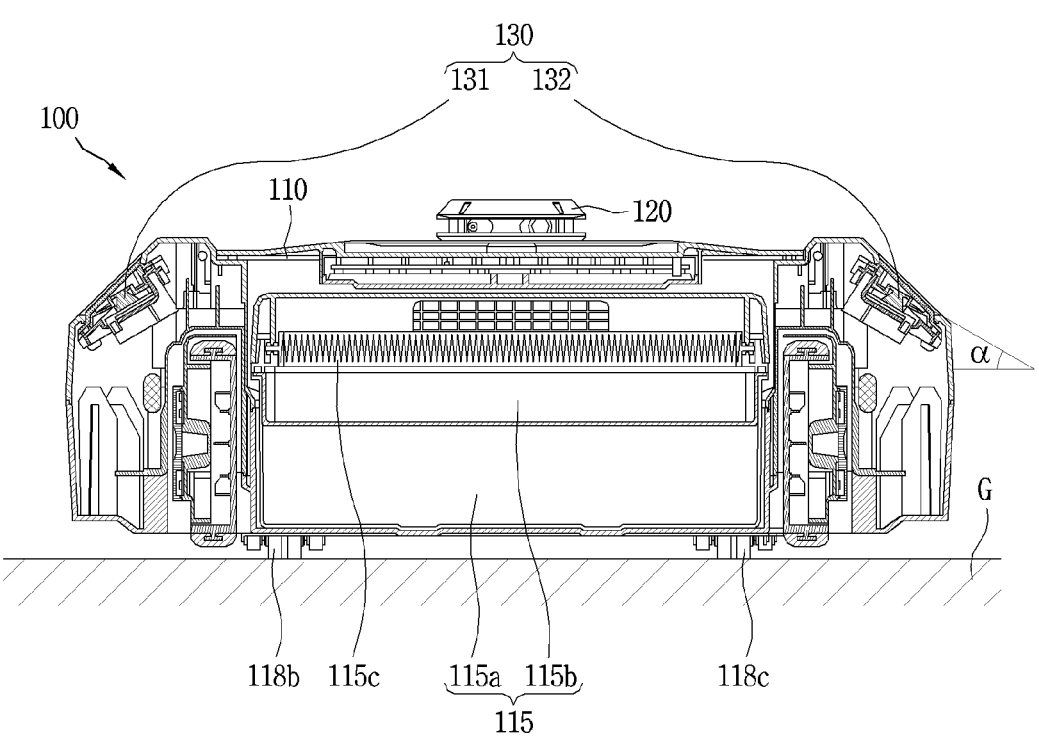
FIG. 5 is a cross-sectional view of the robot cleaner illustrated in FIG. 3.

FIG. 1 is a perspective view illustrating one example of a robot cleaner 100 in accordance with the present disclosure, FIG. 2 is a planar view of the robot cleaner 100 illustrated in FIG. 1, FIG. 3 is a front view of the robot cleaner 100 illustrated in FIG. 1, FIG. 4 is a view illustrating a lower portion of the robot cleaner 100 illustrated in FIG. 1, and FIG. 5 is a cross-sectional view of the robot cleaner 100 illustrated in FIG. 3.

Referring to FIGS. 1 to 5, the robot cleaner 100 may recognize a surrounding environment on its own and perform a cleaning function suitable for the environment while traveling in a predetermined area. The cleaning function mentioned herein may include a function of suctioning and removing dust or foreign substances existing in the floor area. In addition, the robot cleaner 100 may be used in various environments such as a warehouse, a home, and an office.

The robot cleaner (or robot) 100 may include a cleaner body (or body) 110, a first sensing unit (also referred to a first sensor or a laser sensor) 120, a second sensing unit (or second sensor) 130, a third sensing unit (also referred to as a third sensor or an ultrasonic sensor) 140, and a fourth sensing unit (also referred to as a fourth sensor or an optical sensor) 150.

The cleaner body 110 may include a control unit (not shown) for controlling autonomous driving (or autonomous traveling) of the robot cleaner 100. In addition, the cleaner body 110 may include a wheel unit 117 for traveling of the robot cleaner 100. The robot cleaner 100 may be moved by the wheel unit 117.

The wheel unit 117 may be disposed on a lower portion of the cleaner body 110 to come in contact with the ground G and may be rotatable centering on a shaft perpendicular to the cleaner body 110 for switching a moving direction of the robot cleaner 100. The wheel unit 117 may be provided in plurality on the cleaner body 110 to be operated independently.

Meanwhile, a first battery 111*a* and a second battery 111*b* supplying power for operating the robot cleaner 100 may be coupled to the cleaner body 110. The first and second batteries 111*a* and 111*b* may be detachable from the cleaner body 110 to be recharged separately, or may be recharged while being mounted to the cleaner body 110.

In addition, a display 112 may be disposed on an upper surface of the cleaner body 110 to display various status information related to the operation of the robot cleaner 100 and provide it to the user. The status information may include various pieces of information, such as a power-on/off state, a cleaning state, a cleaning mode, an operation time, and whether or not there is a failure. The cleaning mode may include a mode for cleaning a space, such as a warehouse or a long hallway, without many obstacles along a predetermined pattern, and a mode for cleaning a space, such as an office, with many obstacles without following a predetermined pattern.

In addition, a lamp 113 that displays the state of the robot cleaner 110 in another form together with the display 112 may be disposed on the upper surface of the cleaner body 110. The lamp 113 may be configured to emit light of various colors in various ways.

For example, the lamp 113 may display light by differentiating colors, brightness of light, flickering shape, and the like. Accordingly, even in a situation in which it is difficult for a user to check the status information of the robot cleaner 100 through the display 112, the user can obtain the status information of the robot cleaner 100 more intuitively through light emitted from the lamp 113. Also, in the present disclosure, a case in which one lamp 113 is provided has been described as an example, but the lamp 113 may alternatively be provided in plurality disposed adjacent to each other.

In addition, a first side brush 181 and a second side brush 182 may be provided on both sides of a lower portion of the cleaner body 110, respectively. The first and second side brushes 181 and 182 may be configured to be rotatable centering on an axis perpendicular to the robot cleaner 100, and perform a function of sweeping dust present on the ground G of an outer area of the robot cleaner 100 into a suction unit 119 of the robot cleaner 100. A plurality of first brushes 181*a* and second brushes 182*a* may be disposed respectively on outer circumferential surfaces of the first and second side brushes 181 and 182 to separate foreign substances from the ground G.

The suction unit 119 may perform cleaning by suctioning air containing dust, and as illustrated in FIG. 4, may be disposed on a front area of the lower portion of the cleaner body 110. According to the structure of the suction unit 119, the robot cleaner can more approach foreign substances present in corners or edges of the ground area G, thereby enhancing a cleaning effect.

As illustrated in FIG. 5, a dust box 115 for accommodating foreign substances collected into the cleaner body 110 through the suction unit 119 of the robot cleaner 100 may be disposed in the cleaner body 110. The dust box 115 may include a first accommodating portion 115*a* and a second accommodating portion 115*b* that are partitioned to collect foreign substances having relatively large particles and foreign substances having relatively small particles, respectively. A dust filter 115*c* for filtering foreign substances or dust in air discharged to the outside of the dust box 115 may be mounted to an upper portion of the dust box 115.

Meanwhile, the robot cleaner 100 may include a front caster 118*a*, a first rear caster 118*b*, and a second rear caster 118*c*.

The front caster 118*a* may be disposed on a front end portion of a lower surface of the cleaner body 110. The front caster 118*a* may be rotatable along the ground G while supporting the cleaner body 110 together with the wheel unit 117 during the traveling of the robot cleaner 100. In addition, the first rear caster 118*b* and the second rear caster 118*c* may be disposed on both sides of a rear end portion of the lower surface of the cleaner body 110 to assist the traveling of the robot cleaner 100 while supporting the cleaner body 110 together with the front caster 118*a*.

The first sensing unit 120 may protrude from the upper surface of the cleaner body 110 by a predetermined height. The first sensing unit 120 may irradiate (emit) a laser to the surrounding of the cleaner body 110 to detect an obstacle such as a wall located around the cleaner body 110 in a traveling state or a stopped state of the robot cleaner 100. For example, the first sensing unit 120 may be configured as a LiDAR. The LiDAR is a device that measures a distance to a target object at the surrounding by emitting a pulsed laser and receiving reflected light from the target object, so as to accurately draw the surrounding.

The second sensing unit 130 may be disposed at an upper edge portion of the cleaner body 110 to be inclined with respect to each of a side surface and an upper surface of the cleaner body 110, to capture a lateral direction and an upward direction of the cleaner body 110. For example, the second sensing unit 130 may be implemented as a typical capturing camera. In addition, the second sensing unit 130 may be inclined with respect to the ground G, for example, by an inclination α of 30°. The inclination α of the second sensing unit 130 disposed inside the cleaner body 110 may be smaller than an external inclination of the cleaner body 11, thereby minimizing interference with a laser emitted from the first sensing unit 120.

As illustrated in FIG. 5, the second sensing unit 130 may be disposed at a position lower than a position of the first sensing unit 120 based on a vertical (up and down) direction of the cleaner body 110. The first sensing unit 120 may be disposed behind the second sensing unit 130. Meanwhile, the second sensing unit 130 may be provided by one or may be provided in plurality to be spaced apart from each other.

In addition, the second sensing unit 130 may include a window 130' disposed to cover the second sensing unit 130. The window 130' may include a filter (not shown) through which an infrared region is selectively transmitted, to provide a predetermined part of image information related to the surrounding environment of the robot cleaner 100 even in a dark environment. The filter may be provided directly on the second sensing unit 130 other than the window 130'.

The second sensing unit 130 may include a first camera part (or first camera) 131 and a second camera part (or second camera) 132.

The first camera part 131 and the second camera part 132 may be disposed on one side and another side of an upper edge area of the cleaner body 110, respectively, in an inclined manner, so as to capture the lateral direction and the upward direction of the cleaner body 110. The first camera part 131 and the second camera part 132, as illustrated in FIG. 2, may be disposed at symmetrical positions in a left and right direction based on a front center line CL of the cleaner body 110. Accordingly, the surrounding environment of the cleaner body 110 including a wider area can be captured through the first and second camera parts 131 and 132, and thus an amount of information obtained from images captured through the first and second camera parts 131 and 132 can be more increased. On the other hand, the front of the robot cleaner 100 means a side that the cleaner body 110 travels forward (F), namely, a side in front of (or a front side of) the cleaner body 110, and the rear [rearward (R) opposite to forward (F)] of the robot cleaner 100 means a rear side of the cleaner body 110.

The third sensing unit 140 may be disposed on the front surface of the cleaner main body 110. The third sensing unit 140 may detect distance and direction from an obstacle, which is located around the cleaner body 110, by emitting ultrasonic waves to the front of the cleaner body 110 and receiving reflected ultrasonic waves. The third sensing unit 140, as illustrated in FIG. 3, may be provided in plurality. For example, the third sensing unit 140 may include totally 6 sensors including a first ultrasonic sensor 141, a second ultrasonic sensor 142, a third ultrasonic sensor 143, a fourth ultrasonic sensor 144, a fifth ultrasonic sensor 145, and a sixth ultrasonic sensor 146 disposed at symmetrical positions in the left and right direction based on the front center line CL of the cleaner body 110, and may be disposed at symmetrical positions with predetermined intervals within a range of 60° to left and right based on the front center line CL of the cleaner body 110.

The fourth sensing unit 150 may be disposed on the front surface of the cleaner body 110 to capture (photograph) the front side of the cleaner body 110. The fourth sensing unit 150 may also be configured to capture a depth image including distance information up to an object existing in a capturing area while the robot cleaner 100 is running or stopped. Accordingly, the precision of obstacle detection performed through the fourth sensing unit 150 can be further increased. For example, the fourth sensing unit 150 may detect a small and thin obstacle or threshold located in front of the robot cleaner 100 using the depth image, and may partially recognize even a black object with low reflectivity or a transparent object. Also, an image captured through the fourth sensing unit 150 may be obtained in color or in black and white. As illustrated in FIG. 3, the third sensing unit 140 may be disposed at a position lower than a position of the fourth sensing unit 150 based on the vertical (up and down) direction of the cleaner body 110.

Hereinafter, areas and shapes detected by the first to fourth sensing units 120, 130, 140, and 150 will be described with reference to FIGS. 6 to 10.

Figure 6:
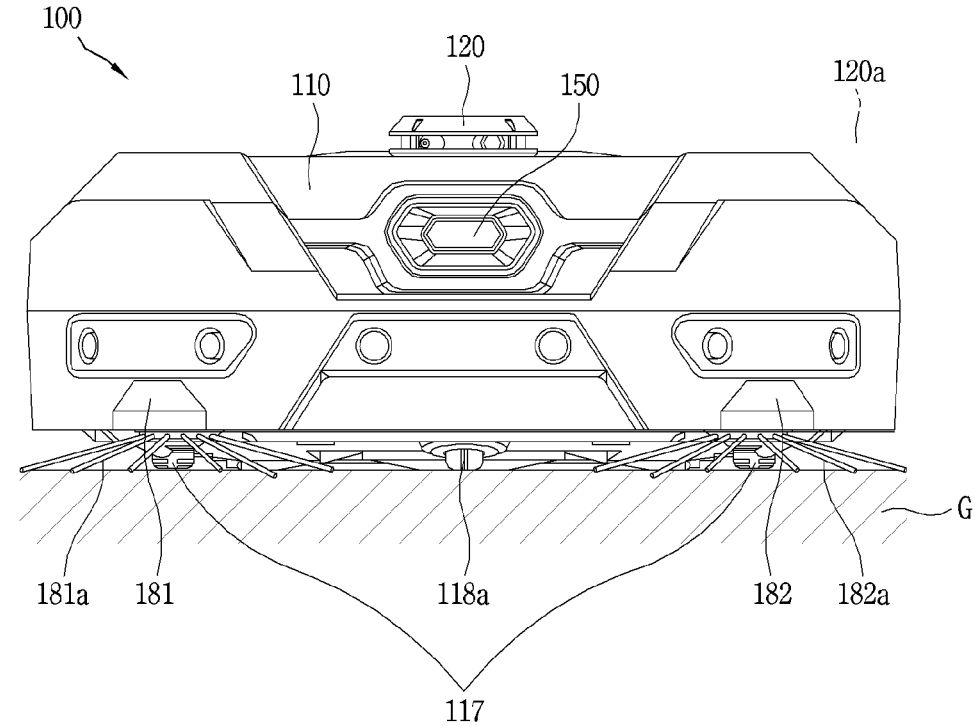
FIGS. 6 and 7 are a front view and a planar view conceptually illustrating the shape of a laser emitted from a first sensing unit illustrated in FIG. 1.
Figure 7:
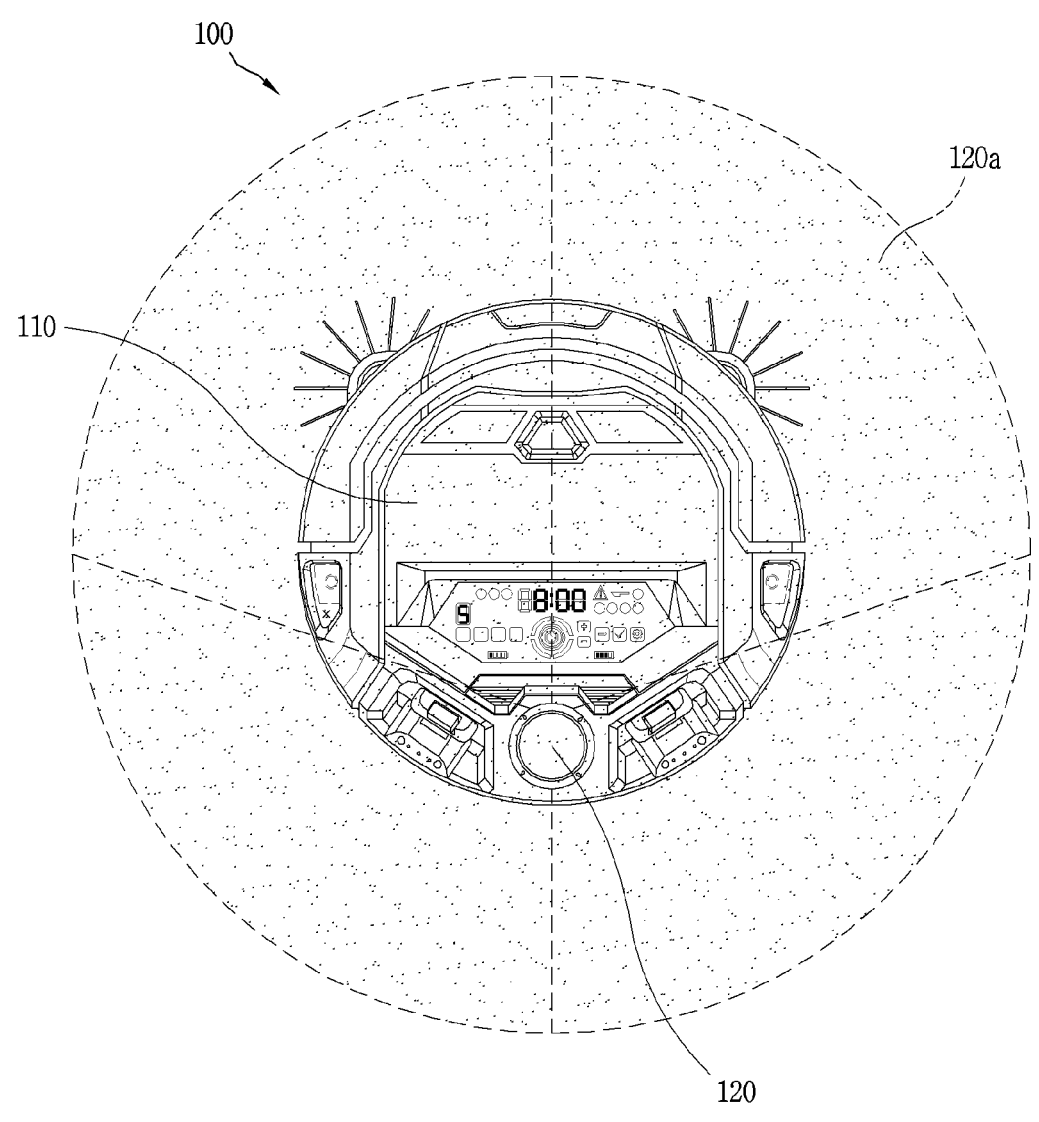
Figure 8:
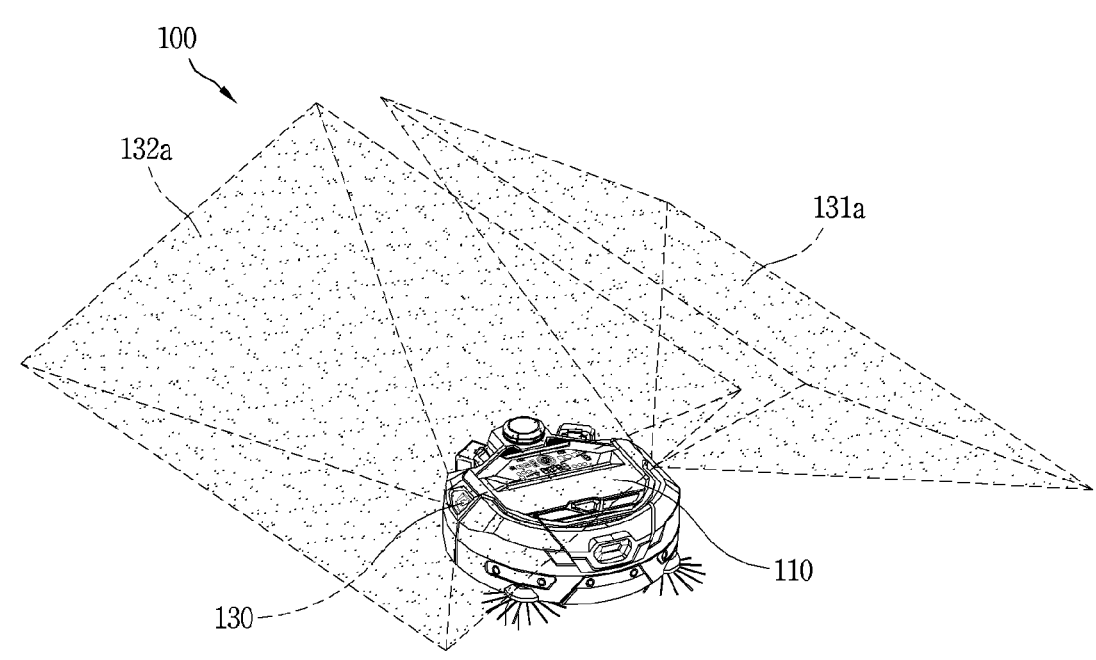
FIG. 8 is a conceptual view illustrating a range of images captured by a second sensing unit illustrated in FIG. 1.
Figure 9:
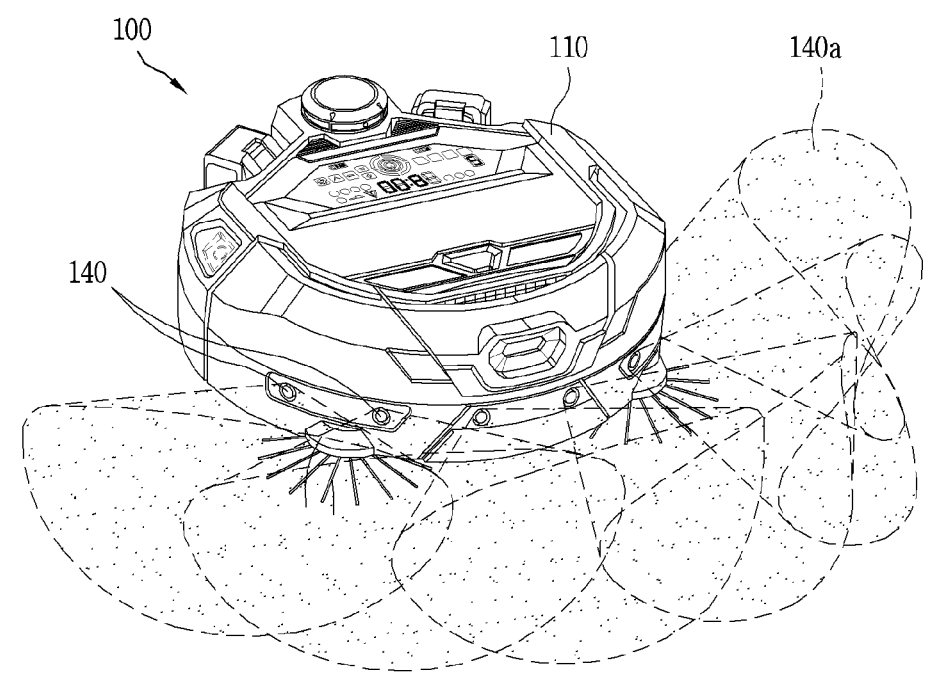
FIG. 9 is a perspective view conceptually illustrating the shape of ultrasonic waves emitted from a third sensing unit illustrated in FIG. 1.
Figure 10:
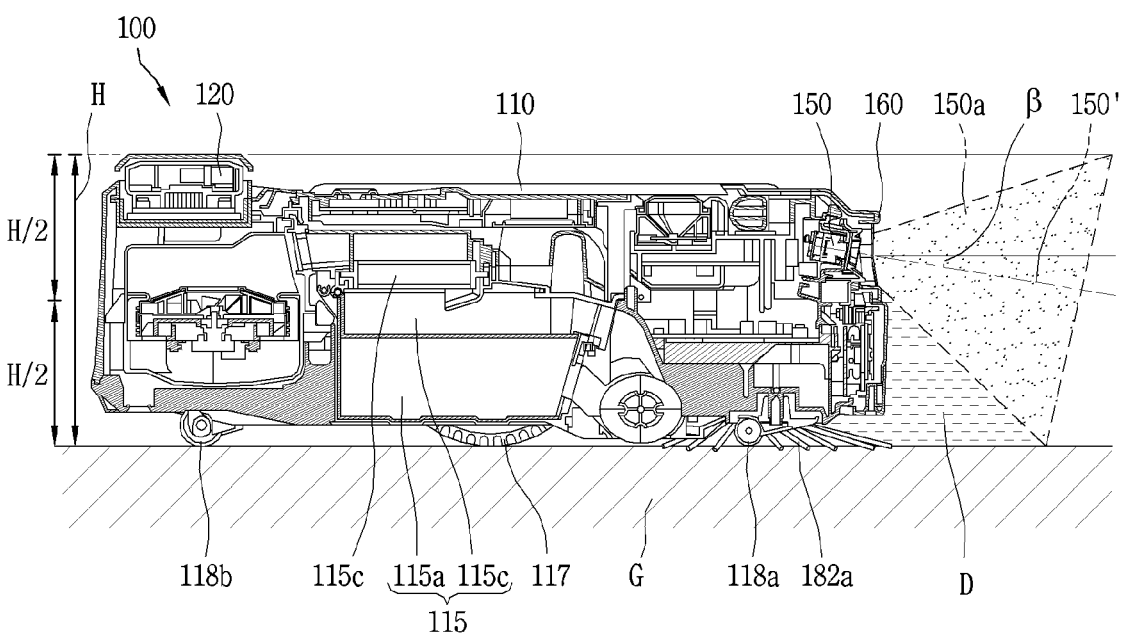
FIG. 10 is a cross-sectional view conceptually illustrating a range of images captured by a fourth sensing unit illustrated in FIG. 1.

FIGS. 6 and 7 are a front view and a planar view conceptually illustrating the shape of a laser emitted from the first sensing unit 120 illustrated in FIG. 1, FIG. 8 is a conceptual view illustrating a range of images captured by the second sensing unit 130 illustrated in FIG. 1, FIG. 9 is a perspective view conceptually illustrating the shape of ultrasonic waves emitted from the third sensing unit 140 illustrated in FIG. 1, and FIG. 10 is a cross-sectional view conceptually illustrating a range of images captured by the fourth sensing unit 150 illustrated in FIG. 1.

First, referring to FIGS. 6 and 7, the first sensing unit 120 may emit a linear laser 120a in a laser irradiation range of 360 degrees around the first sensing unit 120, and detect obstacles around the robot cleaner 100 located within a preset detection distance, for example, within 15 cm to 1100 cm. Also, the first sensing unit 120 may detect the obstacles around the cleaner body 110 by irradiating the laser 120a at intervals of 0.25 degrees within the laser irradiation range of 360 degrees.

Next, referring to FIG. 8, the second sensing unit 130 may capture the lateral direction and the upward direction of the cleaner body 110 at one side and another side of an upper edge area of the cleaner body 110, respectively, to thus obtain a first camera image 131a and a second camera image 132a.

Next, referring to FIG. 9, the third sensing unit 140 may emit ultrasonic waves to an area around the front of the cleaner body 110 and receive reflected ultrasonic waves, thereby detecting obstacles located at the area around the front of the cleaner body 110. For example, the third sensing unit 140 may have a detection distance in the range of 5 cm to 30 cm, and may form an ultrasonic wave detection area 140a having a shape illustrated in FIG. 9.

Finally, referring to FIG. 10, the fourth sensing unit 150 may be disposed such that an optical axis 150' of the fourth sensing unit 150 is inclined downward toward the front of the cleaner body 110. For example, the fourth sensing unit 150 may be inclined by an inclination β of 10° toward the ground G.

In addition, the fourth sensing unit 150 may be configured to have a range, namely, an angle of view 150a for capturing images including from a ground area (or ground) G to a highest area H (a top with the highest height H). For example, images captured by the fourth sensing unit 150 may have angles of view having ratios of horizontal width 74, vertical height 58, and distance from scene to lens 88. In addition, an obstacle detection distance by the fourth sensing unit 150 may be in a range of 10 cm to 100 cm.

With the configuration of the fourth sensing unit 150, as illustrated in FIG. 10, an unavailable capture zone (i.e., a dead zone D)) that is generated at a front lower side of the robot cleaner 100 can be reduced. Accordingly, the fourth sensing unit 150 can detect an obstacle on the ground G existing in an area closer to the robot cleaner 100 and also detect an obstacle located at a front upper side of the robot cleaner with a height, at which the robot cleaner 100 is not allowed to pass.

Hereinafter, a feature that the detection functions of the first to fourth sensing units 120, 130, 140, and 150 are complemented each other will be described with reference to FIGS. 11 and 12.

Figure 11:
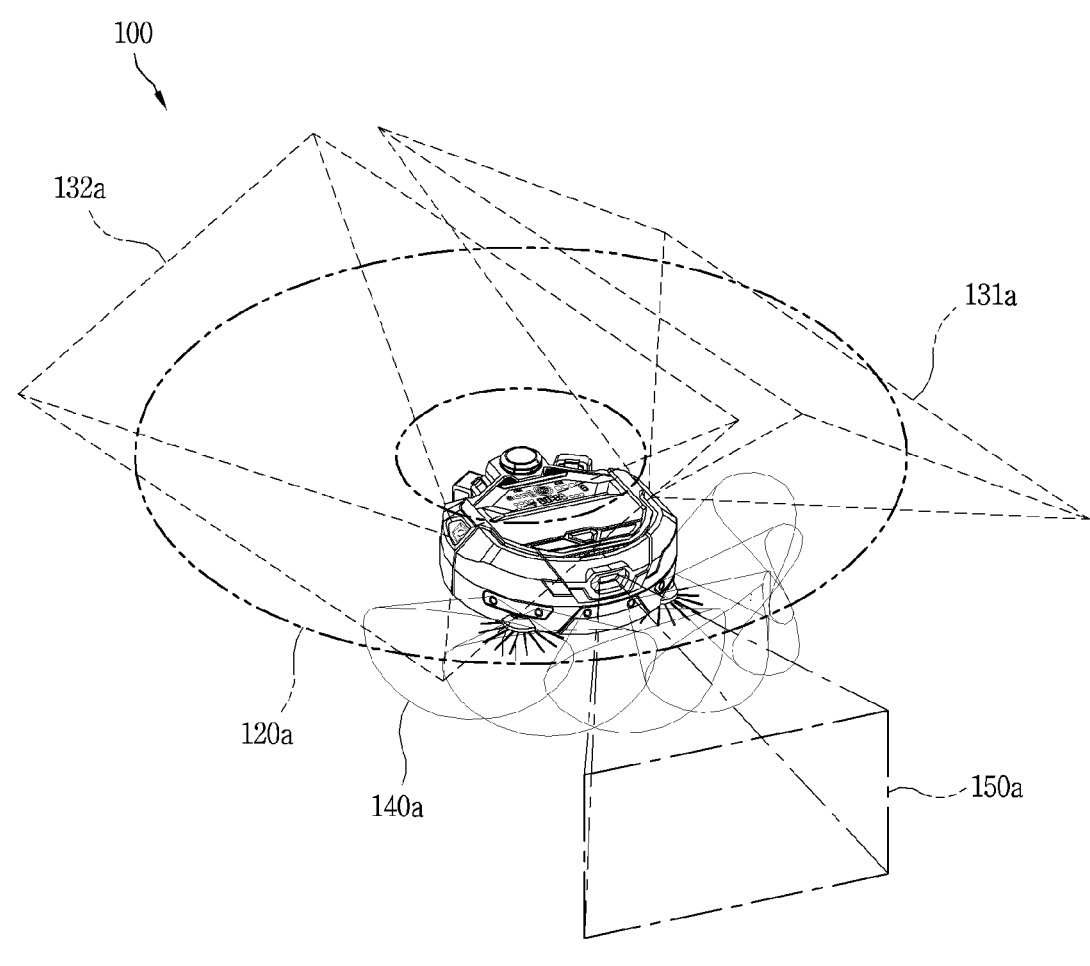
FIGS. 11 and 12 are a perspective view and a lateral view conceptually illustrating areas detected respectively by the first sensing unit, the second sensing unit, the third sensing unit, and the fourth sensing unit illustrated in FIG. 1.
Figure 12:
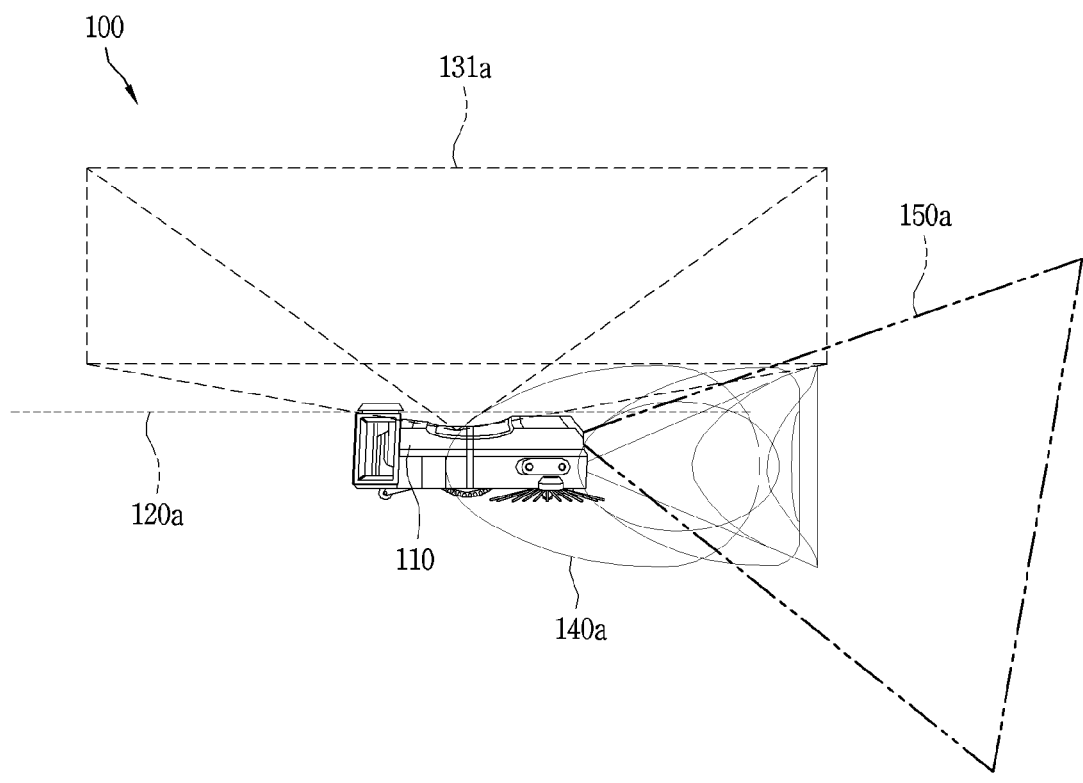

FIGS. 11 and 12 are a perspective view and a lateral view conceptually illustrating areas detected respectively by the first sensing unit 120, the second sensing unit 130, the third sensing unit 140, and the fourth sensing unit 150 illustrated in FIG. 1.

As illustrated in FIGS. 11 and 12, first, the first sensing unit 120 may detect only an obstacle located at the same height as the height at which the first sensing unit 120 is disposed. Also, since the first sensing unit 120 is a sensor using light such as a laser, it may be incapable of detecting a dark object or a transparent object that does not reflect light well. Also, there may be a case where the second sensing unit 130 is incapable of capturing an area out of an angle of view.

The third sensing unit 140 may detect a dark object with a black color or a transparent object such as glass, which is difficult to be detected by an optical sensor such as the first sensing unit 120 or the fourth sensing unit 150 due to poor light reflection. However, the third sensing unit 140 may be difficult to detect an object made of a fabric material or a sponge material that absorbs sound waves, an object having a sharp angle, or a thin object of 2 cm or less.

The fourth sensing unit 150 as an optical sensor can detect obstacles located at top and bottom at the front of the robot cleaner 100. Although it is the optical sensor, the fourth sensing unit 150 may detect an entire surface of an object, other than a cross section, using depth images and thus can partially recognize even a dark object or a transparent object with low reflectivity.

Here, the control unit may merge all or parts (some) of information measured by the first sensing unit 120 and image information captured by the first camera part 131 and the second camera part 132, to detect a current position of the robot cleaner 100 in a traveling area. For example, the control unit may measure distance information to adjacent objects through the first sensing unit 120 with respect to areas, which are not captured by the first and second camera parts 131 and 132 disposed on both left and right sides of the upper surface of the cleaner body 110, and use the measured distance information to create data for recognizing the position of the robot cleaner 100.

In addition, the control unit of the robot cleaner 100 may merge all or parts of information measured by the first sensing unit 120, information measured by the third sensing unit 140, and image information captured by the fourth sensing unit 150, to detect obstacles located around the cleaner body 110. For example, the fourth sensing unit 150 using light may capture the front of the cleaner body 110 to detect an obstacle that the third sensing unit 140 using ultrasonic waves cannot detect. In addition, the fourth sensing unit 140 may detect obstacles located at the upper and lower sides in front of the cleaner body, which are difficult to be detected by the first sensing unit 120 protruding from the upper surface of the cleaner body 110, thereby complementing an undetectable area of the first sensing unit 120.

As described above, in the robot cleaner 100 according to the present disclosure, through the optimized configuration and arrangement of the first to fourth sensing units 120, 130, 140, and 150 that detect different areas while using different methods such as light or ultrasonic waves, insufficient detection functions of the first to fourth sensing units 120, 130, 140, and 150 can be complemented. Accordingly, autonomous driving and obstacle avoidance performances of the robot cleaner 100 can be stably implemented even in an environment with a complex terrain and many obstacles such as a factory or office, or in a dark environment with a shortage of light.

INDUSTRIAL AVAILABILITY

The present disclosure can be used in industrial fields related to robot cleaners having an autonomous driving function.

The invention claimed is:

1. A robot comprising:
   a body including a control unit for controlling autonomous driving;
   a first sensor protruding from an upper surface of the body to irradiate a laser to surroundings of the body so as to detect obstacles located at the surroundings of the body;
   a second sensor positioned on an upper edge portion of the body to be inclined with respect to a side surface and an upper surface of the body, to capture sensor data in a lateral direction and an upward direction of the body;
   a third sensor positioned on a front surface of the body to detect obstacles located at surroundings in front of the body using ultrasonic waves reflected after being emitted to the surroundings in front of the body; and
   a fourth sensor positioned on the front surface of the body to capture sensor data about a front of the body,
   wherein the second sensor is provided at a position lower than a position of the first sensor based on a vertical direction of the body,
   wherein the second sensor includes a window disposed to cover the second sensor, and the window includes a filter through which an infrared region is selectively transmitted,
   wherein the second sensor includes a first camera and a second camera positioned on respective sides of the upper edge portion of the body in an inclined manner and disposed at a rear position of the body, to capture sensor data in respective lateral directions and the upward direction of the body,
   wherein the control unit merges information measured by the first sensor and image information captured by the first camera and the second camera, to detect a current position of the robot in a traveling area,
   wherein the control unit merges information measured by the first sensor, information measured by the third sensor, and image information captured by the fourth sensor, to detect obstacles located around the body,
   wherein the first sensor is positioned behind the second sensor,
   wherein the first sensor detects an obstacle located within a preset detection distance by irradiating a linear laser at intervals of a predetermined angle within a range of 360 degrees,
   wherein the fourth sensor captures a depth image including distance information related to an object within a capturing area,
   wherein an inclination of the second sensor is smaller than an external inclination of the body,
   wherein the third sensor is provided at a position lower than a position of the fourth sensor based on a vertical direction of the body,
   wherein the robot comprises a plurality of the third sensor provided at symmetrical positions in a left and right direction based on a front center line of the body,
   wherein the third sensor has a detection distance of a predetermined range and forms an ultrasonic detection area, and
   wherein the fourth sensor is positioned such that the fourth sensor has an optical axis that is inclined downward toward the front of the body, and has an image capturing range including a space extending from a ground area up to a highest area of the body.

2. The robot of claim 1, wherein the first camera and the second camera are disposed at symmetrical positions in a left and right direction based on a front center line of the body.

3. A robot comprising:
   a body including a control unit for controlling autonomous driving;
   a laser sensor protruding from an upper surface of the body and to irradiate a laser to surroundings of the body so as to detect obstacles located at the surroundings of the body;
   a capturing camera positioned on an upper edge portion of the body to be inclined with respect to a side surface and an upper surface of the body and disposed at a rear position of the body, to capture sensor data in a lateral direction and an upward direction of the body;

an ultrasonic sensor positioned on a front surface of the body to detect obstacles at surroundings in front of the body using ultrasonic waves reflected after being emitted to the surroundings in front of the body; and an optical sensor positioned on the front surface of the body to capture image data of the front of the body, wherein the control unit merges at least a portion of information measured by the laser sensor, information measured by the ultrasonic sensor, and the image data captured by the optical sensor to detect obstacles located at the surroundings of the body, wherein the capturing camera includes a window disposed to cover the capturing camera, and the window includes a filter through which an infrared region is selectively transmitted, wherein the control unit merges information measured by the laser sensor and image information captured by the capturing camera, to detect a current position of the robot in a traveling area, wherein the laser sensor is positioned behind the second sensor, wherein the laser sensor detects an obstacle located within a preset detection distance by irradiating a linear laser at intervals of a predetermined angle within a range of 360 degrees, wherein the optical sensor captures a depth image including distance information related to an object within a capturing area, wherein an inclination of the capturing camera is smaller than an external inclination of the body.

4. The robot of claim 1, further comprising a wheel coupled to the body, the wheel rotating to cause the body to travel autonomously while performing a cleaning function.

5. The robot of claim 1, wherein a first inclination angle of the second sensor is less than a second inclination angle of an external surface of the body where the first sensor is received.

6. The robot of claim 1, wherein the first sensor irradiates the laser along a horizontal plane so as to detect obstacles located at the surroundings of the body along the horizontal plane, and the second sensor captures the sensor data above the horizontal plane.

7. The robot of claim 1, wherein the first sensor irradiates the laser along a horizontal plane so as to detect obstacles located at the surroundings of the body along the horizontal plane, and the fourth sensor captures the sensor data about a space in the front of the body from a ground surface to above the horizontal plane.

8. The robot of claim 1, wherein the third sensor detects ultrasonic waves reflected from a region in the front of the body, and the second sensor captures the sensor data above the region in the front of the body.

* * * * *